(12) United States Patent
Liu (10) Patent No.: US 10,361,409 B2
(45) Date of Patent: Jul. 23, 2019

(54) CUPBOARD LAMP

(71) Applicant: SHENZHEN ENVISION TECHNOLOGY LIMITED, Shenzhen, Guangdong (CN)

(72) Inventor: Yiquan Liu, Guangdong (CN)

(73) Assignee: SHENZHEN ENVISION TECHNOLOGY LIMITED, Shenzhen (CN)

(*) Notice: Subject to any disclaimer, the term of this patent is extended or adjusted under 35 U.S.C. 154(b) by 332 days.

(21) Appl. No.: 15/311,413

(22) PCT Filed: Sep. 30, 2016

(86) PCT No.: PCT/CN2016/101149
§ 371 (c)(1),
(2) Date: Nov. 15, 2016

(87) PCT Pub. No.: WO2017/215152
PCT Pub. Date: Dec. 21, 2017

(65) Prior Publication Data
US 2018/0183021 A1    Jun. 28, 2018

(30) Foreign Application Priority Data

Jun. 13, 2016 (CN) .......................... 2016 2 0570356
Sep. 5, 2016 (CN) .......................... 2016 2 1037891
Sep. 5, 2016 (CN) .......................... 2016 2 1037895

(51) Int. Cl.
*H01M 2/10*    (2006.01)
*F21S 8/00*    (2006.01)
(Continued)

(52) U.S. Cl.
CPC ............. *H01M 2/1055* (2013.01); *F21S 8/00* (2013.01); *F21S 9/02* (2013.01); *F21V 23/02* (2013.01);
(Continued)

(58) Field of Classification Search
CPC ...... H01M 2/1055; H01M 2/10; H01M 2/204; H01M 2/26; H01M 2220/10; H01M 2/105;
(Continued)

(56) References Cited

U.S. PATENT DOCUMENTS 2,431,116 A * 11/1947 Grover .................. H01M 2/105
                                                    429/99
6,176,536 B1 * 1/2001 Miller ...................... B60N 3/08
                                                    224/311
(Continued)

FOREIGN PATENT DOCUMENTS

CN    202277549 U  *  6/2012  ................ F21L 4/00
CN    203810084 U  *  9/2014  ................ F21L 4/00

*Primary Examiner* — Ahn T Mai
*Assistant Examiner* — Fatima N Farokhrooz
(74) *Attorney, Agent, or Firm* — Stein IP, LLC (57) ABSTRACT

The utility model provides a cupboard lamp, comprising a battery compartment; wherein the battery compartment comprises a compartment housing component and a compartment cover component; the compartment housing component comprises a first battery cavity and a second battery cavity; the compartment housing component also comprises a third battery cavity; and the third battery cavity is positioned between the first battery cavity and the second battery cavity, and is higher than the first battery cavity and the second battery cavity. The third battery cavity is disposed at a relatively higher position between the first battery cavity and the second battery cavity, so the battery compartment is more compactly structured and has a better power supply capability. The cupboard lamp has a long service life, a smaller size and a more beautiful appearance.

9 Claims, 6 Drawing Sheets

(51) Int. Cl.
*F21S 9/02* (2006.01)
*H01M 2/26* (2006.01)
*F21V 23/02* (2006.01)
*H01M 2/20* (2006.01)
*F21V 23/04* (2006.01)
*F21Y 115/10* (2016.01)

(52) U.S. Cl.
CPC ............... *F21V 23/04* (2013.01); *H01M 2/10* (2013.01); *H01M 2/204* (2013.01); *H01M 2/26* (2013.01); *F21V 23/0471* (2013.01); *F21Y 2115/10* (2016.08); *H01M 2220/10* (2013.01)

(58) Field of Classification Search
CPC .. H01M 2/005; H01M 2/1011; H01M 2/1016; H01M 2/1022; H01M 2/1027; H01M 2/1033; F21S 8/00; F21S 9/02; F21V 23/02; F21V 23/04; F21V 23/0471; F21V 15/01; F21Y 2115/10; F21Y 2101/00; F21W 2131/301; F21W 2131/405

See application file for complete search history.

(56) References Cited

U.S. PATENT DOCUMENTS

| | | | | |
|---|---|---|---|---|
| 7,273,983 | B1* | 9/2007 | Rintz | F21S 8/035 174/66 |
| 2005/0254234 | A1* | 11/2005 | Wang | F21L 4/027 362/184 |
| 2006/0291224 | A1* | 12/2006 | England | B60Q 3/74 362/490 |
| 2009/0149255 | A1* | 6/2009 | Fu | A63F 13/02 463/37 |
| 2011/0317403 | A1* | 12/2011 | Fournier | F21S 6/001 362/183 |
| 2014/0266057 | A1* | 9/2014 | Woods | H01M 10/4221 320/128 |
| 2015/0338040 | A1* | 11/2015 | Swope | F21S 8/083 362/183 |
| 2015/0357611 | A1* | 12/2015 | Zhou | H01M 2/1055 429/100 |
| 2016/0172642 | A1* | 6/2016 | Hughes | H01M 2/1077 429/90 |
| 2017/0271721 | A1* | 9/2017 | Cho | H01M 2/202 |

* cited by examiner

CUPBOARD LAMP

CROSS-REFERENCE TO RELATED APPLICATIONS

This application is a national stage of International Application No. PCT/CN2016/101149, filed Sep. 20, 2016, which claims the benefit of priority to Chinese Application No. 201620570356.3, filed Jun. 13, 2016, Chinese Application No. 201621037895.7, filed Sep. 5, 2016, and Chinese Application No. 201621037891.9, filed Sep. 5, 2016, in the State Intellectual Property Office, the disclosures of which are incorporated herein in their entireties by reference.

TECHNICAL FIELD

The utility model relates to the field of electronic products, in particular to a cupboard lamp.

DESCRIPTION OF RELATED ART

An existing cupboard lamp includes a lampshade housing, a light source plate support disposed in the housing, a light source plate installed on the light source plate support and a battery compartment. In order to prolong the service life of the cupboard lamp, a plurality of battery cavities are usually disposed. The plurality of battery cavities are usually arranged in parallel. By using the battery compartment of the above structure, the cupboard lamp is usually large in size, affecting the beauty.

BRIEF SUMMARY OF THE UTILITY MODEL

The technical problem to be solved in the utility model is to provide a compactly structured cupboard lamp.

To solve the above technical problem, the utility model employs the following technical solution. A cupboard lamp includes a battery compartment; the battery compartment includes a compartment housing component and a compartment cover component; the compartment housing component includes a first battery cavity and a second battery cavity; the compartment housing component also includes a third battery cavity; the third battery cavity is positioned between the first battery cavity and the second battery cavity, and is higher than the first battery cavity and the second battery cavity.

Further, the third battery cavity is positioned at a projecting portion between the first battery cavity and the second battery cavity.

Further, the projecting portion includes a recessed surface.

Further, the battery compartment also includes a first connecting member and a second connecting member; the cathode of the first battery cavity and the anode of the third battery cavity are electrically connected through the first connecting member; and the cathode of the third battery cavity and the anode of the second battery cavity are electrically connected through the second connecting member.

Further, the first connecting member and the second connecting member are both L-shaped; one end of each of the first connecting member and the second connecting member is electrically connected with the anode of a battery, and the other end is provided with an elastic plate; and each of the elastic plates is connected with the cathode of another battery.

Further, the compartment cover component also includes a first baffle and a second baffle for fixing a battery in the third battery cavity.

Further, a lampshade, a housing and a light source plate are also included; the light source plate is provided with a light source switch; the housing is provided with a first opening and a second opening; the lampshade includes a first contact pin and a second contact pin; the first contact pin and the second contact pin are respectively penetrated into the first opening and the second opening; the light source switch is a press switch; and the first contact pin is disposed corresponding to the press switch.

Further, the light source plate is provided with at least one infrared probe; the housing includes a middle ring, a housing body and an inner ring; the inner ring extends from the housing body to the battery compartment; the outer diameter of the inner ring is smaller than the outer diameter of the housing body; the inner ring is provided with at least one opening structure corresponding to the infrared probe one by one; and the middle ring is sleeved on the inner ring.

Further, the light source plate is provided with a cushion corresponding to the second contact pin.

Further, the middle ring is provided with at least one recess corresponding to the opening structure one by one.

The utility model has the following beneficial effects: The third battery cavity is disposed at a relatively higher position between the first battery cavity and the second battery cavity, not only improving the power supply capability, but also saving space. Therefore, the battery compartment is more compactly structured, small in size, and favorable for reducing the overall size of the cupboard lamp.

DESCRIPTION OF MARKS

Battery compartment—1; compartment housing component—2; compartment cover component—3; light source plate—4; housing—5; lampshade—6; light source switch—7; first connecting member—11; second connecting member—12; first battery cavity—21; second battery cavity—

22; third battery cavity—23; projecting portion—24; first baffle—31; second baffle—32; infrared probe—41; cushion—42; middle ring—51; inner ring—52; first opening—53; second opening—54; first contact pin—55; second contact pin—56; concave platform—57; first connecting end—110; first elastic plate—111; second connecting end—120; second elastic plate—121; first battery—210; second battery—220; third battery—230; first stopping portion—231; second stopping portion—232; first through-hole—233; recess—511; opening structure—521.

DETAILED DESCRIPTION OF THE PRESENT UTILITY MODEL

The key concept of the present utility model lies in that the third battery cavity is disposed at a relatively higher position between the first battery cavity and the second battery cavity, so the battery compartment is compactly structured and has a better power supply capability.

Refer to FIGS. 1-18. A cupboard lamp includes a battery compartment; the battery compartment includes a compartment housing component and a compartment cover component; the compartment housing component includes a first battery cavity and a second battery cavity; the compartment housing component also includes a third battery cavity; and the third battery cavity is positioned between the first battery cavity and the second battery cavity, and is higher than the first battery cavity and the second battery cavity.

From the above description it can be known that, the utility model has the following beneficial effects: with the third battery cavity disposed at a higher position between the first battery cavity and the second battery cavity, the power supply capability of the battery compartment is improved, and compared with the traditional battery compartment in which a plurality of battery cavities are arranged in parallel, the battery compartment has a more compact structure and a smaller overall size.

Further, the third battery cavity is positioned at a projecting portion between the first battery cavity and the second battery cavity.

Further, the projecting portion includes a recessed surface.

From the above description it can be known that a projecting portion is disposed between the first battery cavity and the second battery cavity, and the projecting portion has a recessed surface, capable of not only providing support for the battery in the third battery cavity, but also preventing the battery from displacement which results in poor contact.

Further, the battery compartment also includes a first connecting member and a second connecting member; the cathode of the first battery cavity and the anode of the third battery cavity are electrically connected through the first connecting member; and the cathode of the third battery cavity and the anode of the second battery cavity are electrically connected through the second connecting member.

Further, the first connecting member and the second connecting member are both "L"-shaped; one end of each of the first connecting member and the second connecting member is electrically connected with the anode of a battery, and the other end is provided with an elastic plate; and each of the elastic plates is connected with the cathode of another battery.

From the above description it can be known that the batteries of the three battery cavities are connected in series through two "L"-shaped connecting members, and one end of each of the connecting members is provided with an elastic plate structure, capable of implementing good electrical connection without off failure.

Further, the compartment cover component also includes a first baffle and a second baffle for fixing a battery in the third battery cavity.

From the above description it can be known that when the compartment cover component and the compartment housing component are fastened, the baffles are used for fixing the battery in the third battery cavity to prevent the battery from rolling or moving, and to ensure good electrical connection of the batteries in the three battery cavities.

Further, a lampshade, a housing and a light source plate are also included; the light source plate is provided with a light source switch; the housing is provided with a first opening and a second opening; the lampshade includes a first contact pin and a second contact pin; the first contact pin and the second contact pin are respectively penetrated into the first opening and the second opening; the light source switch is a press switch; and the first contact pin is disposed corresponding to the press switch.

From the above description it can be known that the UFO-shaped lampshade is provided with the first contact pin, and the first contact pin passes the first opening of the housing to be disposed in corresponding to the press switch of the light source. By pressing the lampshade, the light source switch can be controlled. The operation is simple.

Further, the light source plate is provided with at least one infrared probe; the housing includes a middle ring, a housing body and an inner ring; the inner ring extends from the housing body to the battery compartment; the outer diameter of the inner ring is smaller than the outer diameter of the housing body; the inner ring is provided with at least one opening structure corresponding to the infrared probe one by one; and the middle ring is sleeved on the inner ring.

From the above description it can be known that, the inner ring is provided with an opening structure corresponding to the infrared probe one by one. When a person enters a specific area, the infrared radiation does not get emitted outside of a thick housing, so the infrared probe is more sensitive. A middle ring is designed to be sleeved on the inner ring, avoiding the infrared probe from being exposed to the outside, so the UFO-shaped lamp has an integrated structure. Moreover, the middle ring structure is thin, rarely affecting the sensitivity of the infrared probe.

Further, the light source plate is provided with a cushion corresponding to the second contact pin.

From the above description it can be known that when the lampshade is pressed, the second contact pin is pressed against the cushion, capable of preventing the lampshade from inclining.

Further, the middle ring is provided with at least one recess corresponding to the opening structure one by one.

From the above description it can be known that the middle ring is provided with recesses corresponding to the opening structures, capable of further reducing the thickness of the housing of which the infrared radiation gets emitted outside, and further improving the sensitivity of the infrared probe.

Embodiment

Figure 1:
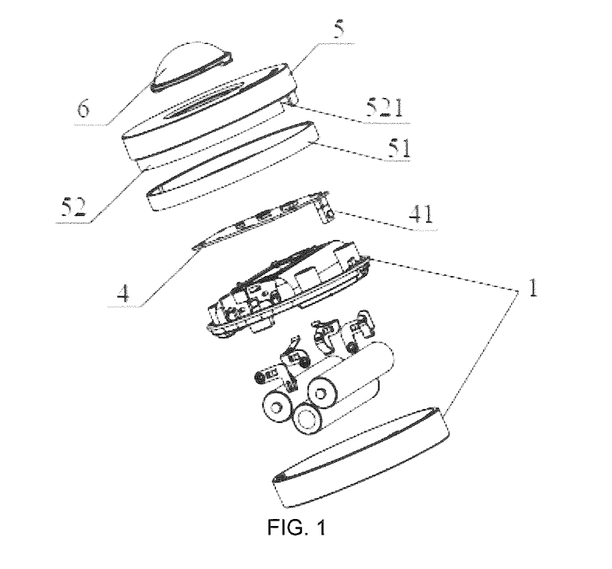
FIG. 1 is an exploded view of a cupboard lamp.
Figure 2:
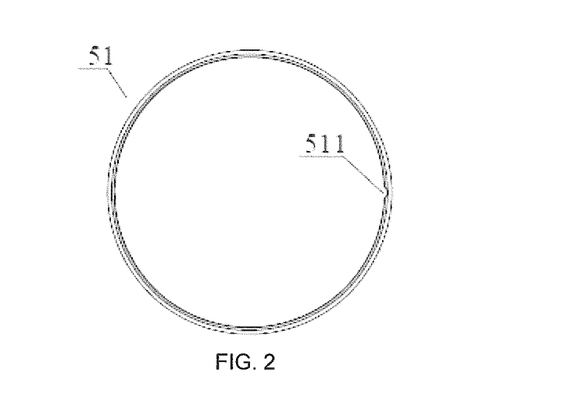
FIG. 2 is a vertical view of a middle ring.

Refer to FIGS. 1-18. The embodiment of the utility model is as follows. As shown in FIG. 1, a UFO-shaped lamp includes a battery compartment 1, a light source plate 4, a housing 5 and a lampshade 6; the battery compartment 1 and the housing 5 are detachably connected; the light source plate 4 is provided with at least one infrared probe 41; and the infrared probe 41 is electrically connected with a light source switch on the light source plate 4. In this embodiment, one infrared probe 41 is disposed; of course, two or more infrared probes can also be disposed. When two or more infrared probes are disposed, the infrared probes are symmetrically disposed on the light source plate 4. When a person enters the sensing area of the UFO-shaped lamp, the infrared probe 41 senses the infrared radiation of the human body and then triggers the switch of the UFO-shaped lamp, and then the UFO-shaped lamp turns on. After the person leaves the area, the UFO-shaped lamp turns off. The housing 5 includes a middle ring 51, a housing body and an inner ring 52; the inner ring 52 extends from the housing body toward the battery compartment 1; the outer diameter of the inner ring 52 is smaller than the outer diameter of the housing body; and the middle ring 51 is sleeved on the inner ring 52. The housing 5 of the UFO-shaped lamp is relatively thick, so the infrared emission capability is poor, affecting the sensitivity of the infrared probe 41. Therefore, the inner ring 52 is provided with at least one opening structure 521 respectively corresponding to the infrared probe(s) 41 one by one. As shown in FIG. 2, in this embodiment, a recess 511 is disposed at a position corresponding to the opening structure 521 of the middle ring 51. The recess 511 further reduces the thicknesses of the housing for infrared emission, further improving the sensitivity of the infrared probe 41.

Figure 3:
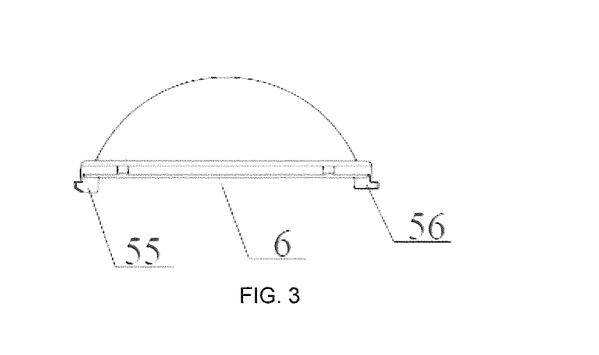
FIG. 3 is a front view of a lampshade.
Figure 4:
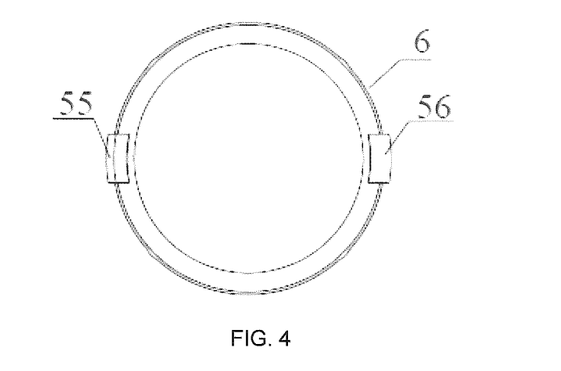
FIG. 4 is a bottom view of the lampshade.
Figure 5:
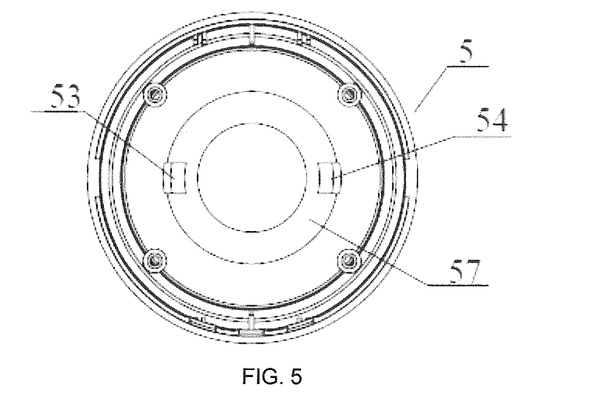
FIG. 5 is a bottom view of a housing.
Figure 6:
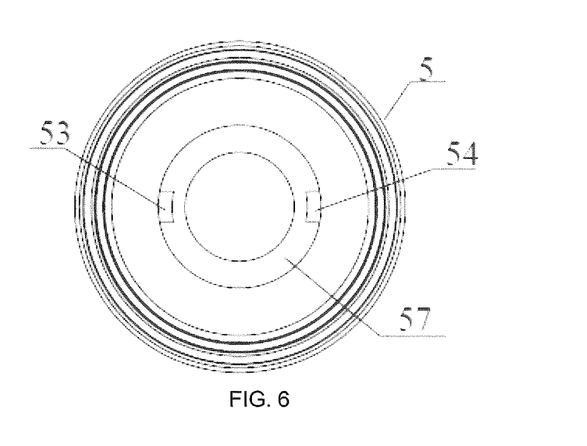
FIG. 6 is a top view of the housing.
Figure 7:
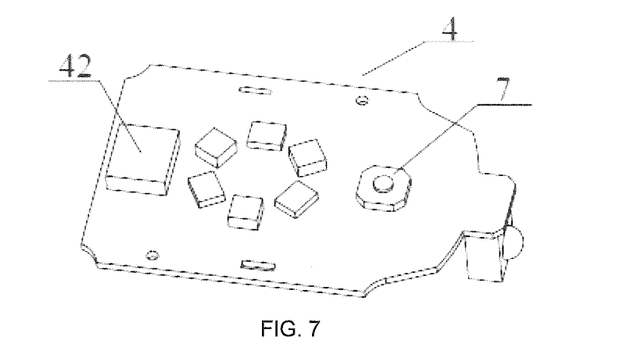
FIG. 7 is a top view of a light source plate.

As shown in FIG. 3 and FIG. 4, in this embodiment, the lampshade 6 is a round and concave shape, and a first contact pin 55 and a second contact pin 56 are symmetrically disposed at the lower edge of the lampshade 6. As shown in FIG. 5 and FIG. 6, the housing 5 is provided with a concave platform 57; the concave platform 57 is positioned on a plane a little lower than the top surface of the housings; the concave platform 57 is symmetrically provided with a first opening 53 and a second opening 54; the first opening 53 and the second opening are smaller than the concave platform 57 in width, and extend to the edges of the concave platform 57 and the housings top surface. As shown in FIG. 7, the light source plate 4 is provided with a press light source switch 7 and a cushion 42; the cushion 42 is a foam structure, and of course can be a spring or be made of other elastic materials. In this embodiment, the first contact pin 55 and the second contact pin 56 are respectively penetrated into the first opening 53 and the second opening 54; the first contact pin 55 is disposed corresponding to the light source switch 7; the second contact pin 56 is disposed corresponding to the cushion 42; when the lampshade 6 is pressed, the first contact pin 55 contacts the upper surface of the light source switch 7 to trigger the light source switch 7 to control the on-off of a light source, and the second contact pin 56 contacts the foam cushion 42 on the light source plate 4 at the same time. Preferably, in order to prevent the lampshade 6 from inclining during pressing, the upper surface of the cushion 42 and the upper surface of the light source switch 7 are on the same plane.

Figure 8:
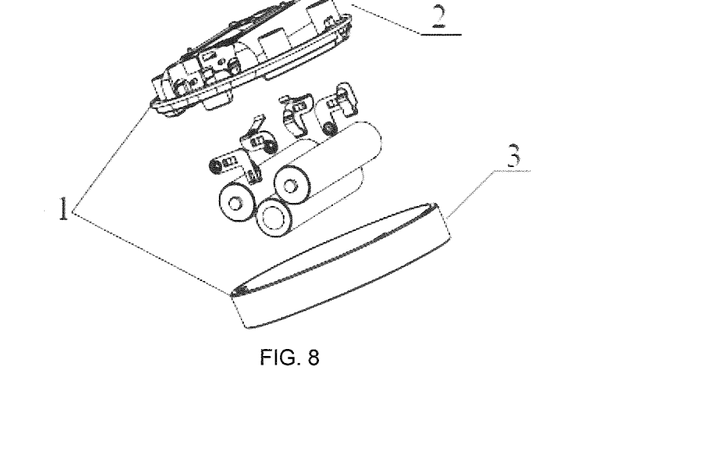
FIG. 8 is a decomposed view of a battery compartment.
Figure 9:
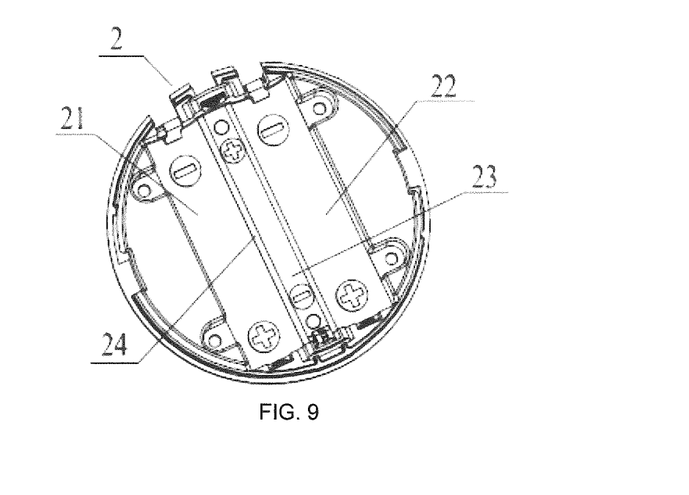
FIG. 9 is an internal view of a compartment housing component.

As shown in FIG. 8, the battery compartment 1 includes a compartment housing component 2 and a compartment cover component 3, wherein the light source plate 4 is fixed on the compartment housing component 2. As shown in FIG. 9, the compartment housing component 2 includes a first battery cavity 21, a second battery cavity 22 and a third battery cavity 23; the third battery cavity 23 is located between the first battery cavity 21 and the second battery cavity 22 and is higher than the first battery cavity 21 and the second battery cavity 22. Of course, in order to compact the structure and reduce the space occupied, the third battery cavity 23 does not need to be entirely higher than the first battery cavity 21 and the second battery cavity 22, but only relatively higher than the first battery cavity 21 and the second battery cavity 22. The first battery cavity 21 and the second battery cavity 22 are not in tight connection, between which a projecting portion 24 can be disposed; the top of the projecting portion 24 is lower than the tops of the first battery cavity 21 and the second battery cavity 22. The surface of the projecting portion 24 is recessed, and the recessed radian is consistent with the battery radian. The third battery cavity 23 is positioned at the projecting portion 24. When a battery is placed in the third battery cavity 23, the battery is just clamped between the batteries placed in the first battery cavity 21 and the second battery cavity 22, and directly positioned on the recessed surface.

Figure 10:
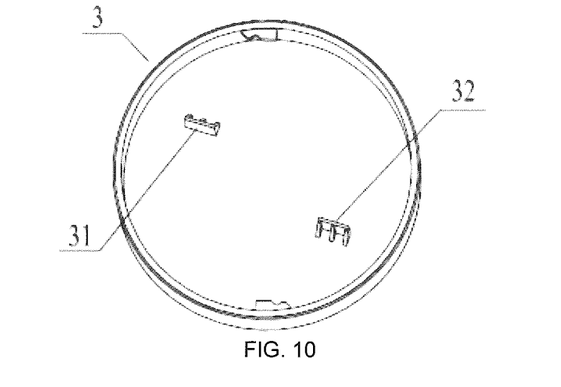
FIG. 10 is an internal view of a compartment cover component.
Figure 11:
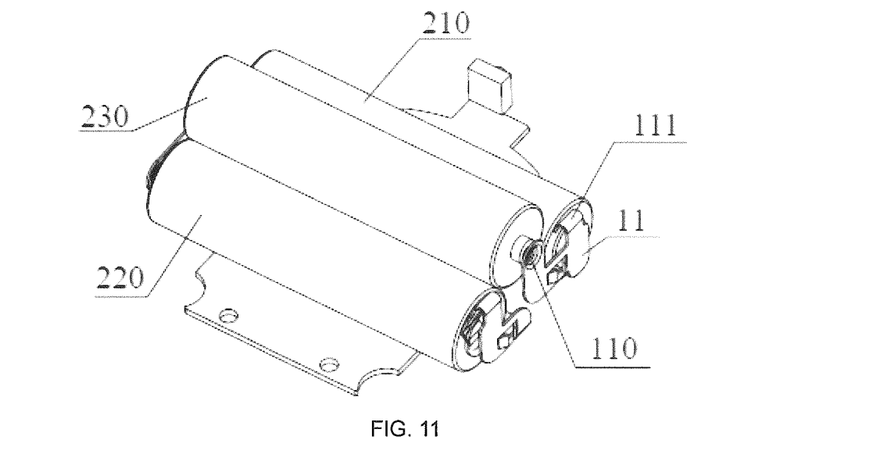
FIG. 11 is a schematic view of a structure in which a first connecting member is in connection with a battery.
Figure 12:
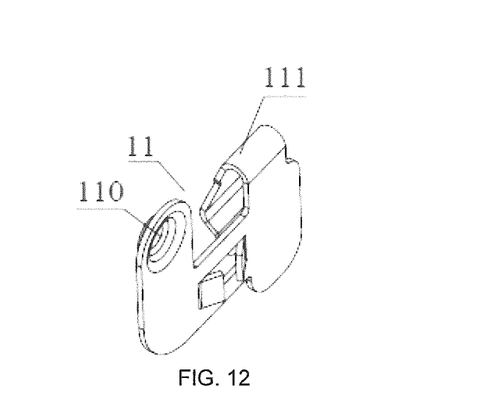
FIG. 12 is an amplified structural view of the first connecting member.

Refer to FIG. 10 and FIG. 11. In this embodiment, the compartment cover component 3 also includes a first baffle 31 and a second baffle 32. The distance between the first baffle 31 and the second baffle 32 is consistent with the battery diameter. When the compartment cover component 3 is fastened with the compartment housing component 2, the first baffle 31 and the second baffle 32 are used for fixing the battery in the third battery cavity 23 to prevent the battery from rolling or moving. The compartment cover component 3 and the compartment housing component 2 are connected through a fastening structure and can also be connected in other detachable ways.

Figure 13:
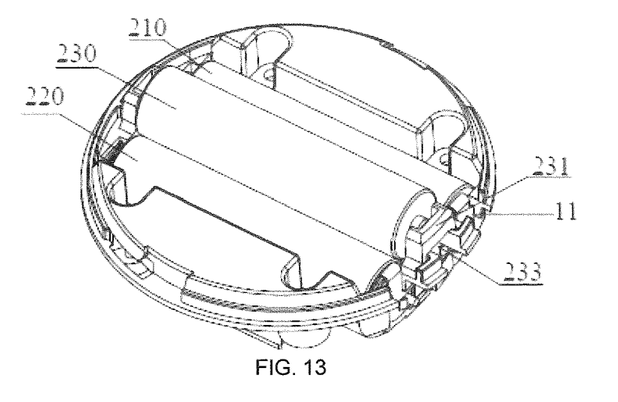
FIG. 13 is a top view 1.
Figure 14:
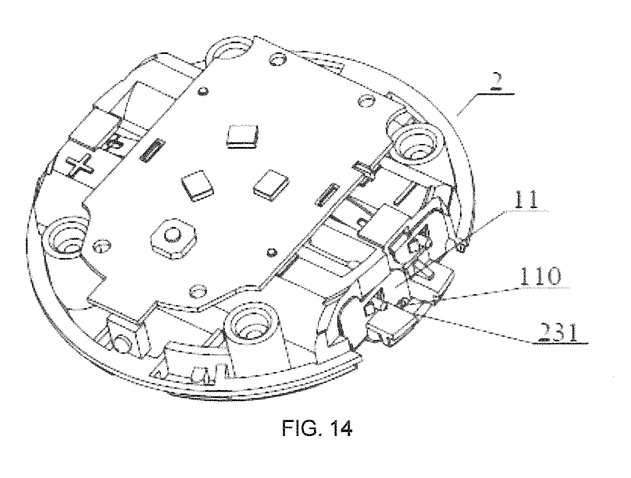
FIG. 14 is a bottom view 1.
Figure 15:
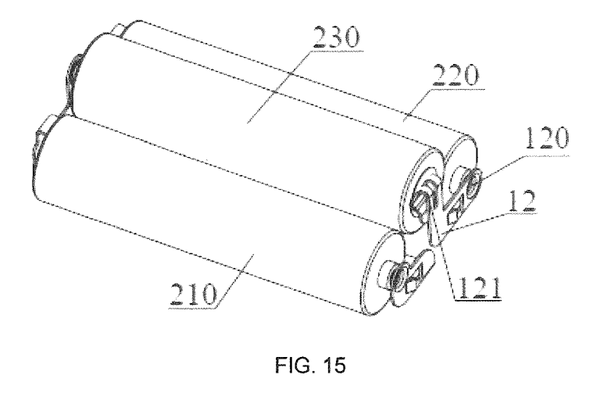
FIG. 15 is a schematic view of a structure in which a second connecting member is in connection with a battery.
Figure 16:
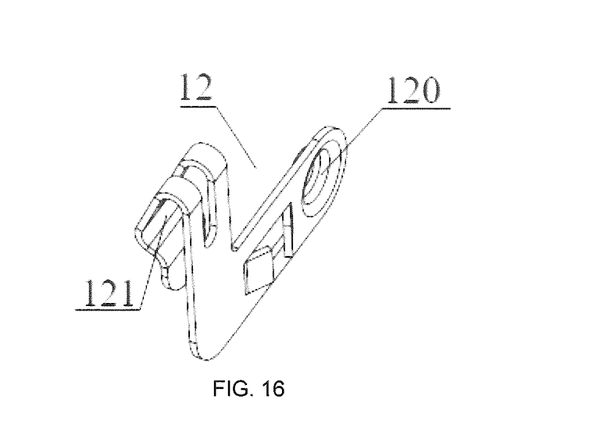
FIG. 16 is an amplified structural view of the second connecting member.

In use, a first battery 210, a second battery 220 and a third battery 230 are respectively placed in the three battery cavities 21-23 of the battery compartment 1, and the three batteries 210, 220, 230 are disposed in a triangular shape. Refer to FIGS. 11-14. In this embodiment, the battery compartment 1 also includes an L-shaped first connecting member 11; the first connecting member 11 includes a first connecting end 110 and a first elastic plate 111; the first battery 210 is connected to the third battery 230 through the first connecting member 11. FIG. 6 is a view of the compartment 2 housing component from the angle of the compartment cover component 3. FIG. 14 is a view of the compartment housing component 2 in the direction opposite from FIG. 13. As shown in FIG. 13 and FIG. 14, a first stopping portion 231 is disposed at one end of the third battery cavity 23; a first through-hole 233 is disposed at the lower end of the first stopping portion 231; the first connecting end 110 of the first connecting member 11 passes the first through-hole 233 from the outside to the inside to contact the anode of the third battery 230, and the first elastic plate 111 is in pressed connection with the cathode of the first battery 210.

Figure 17:
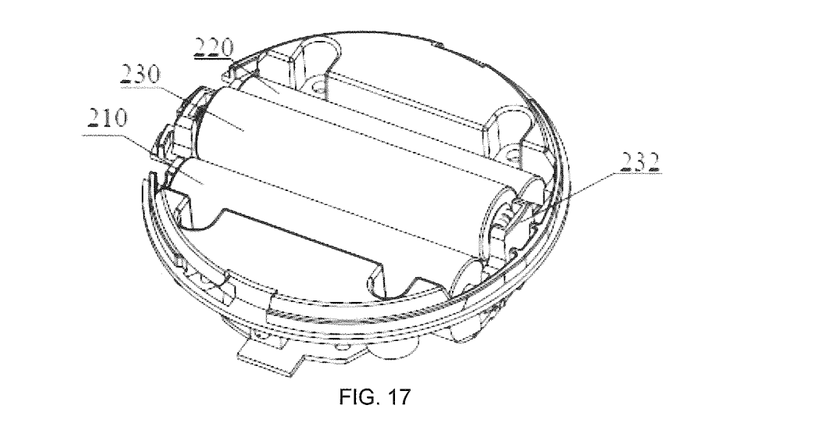
FIG. 17 is a top view 2.
Figure 18:
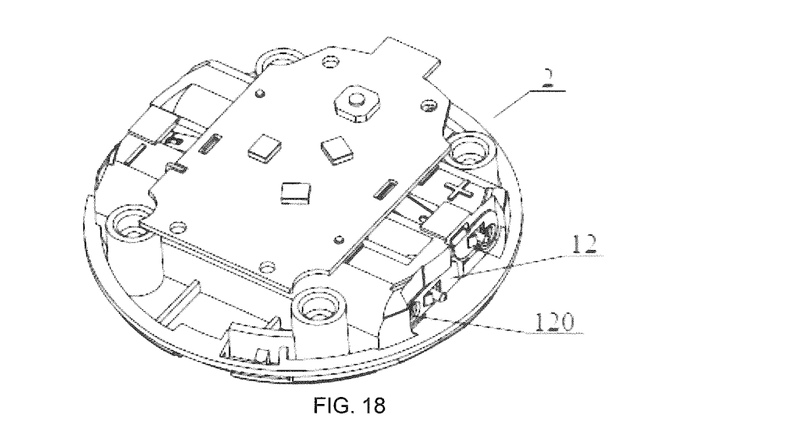
FIG. 18 is a bottom view 2.

Refer to FIGS. 15-18. In this embodiment, the battery compartment 1 also includes a second connecting member 12; the second connecting member 12 includes a second connecting end 120 and a second elastic plate 121; the second battery 220 is connected to the third battery 230 through the second connecting member 12. FIG. 10 is a view of the compartment housing component 2 from the angle of the compartment cover component 3. FIG. 11 is a view of the compartment housing component 2 in the direction opposite from FIG. 10. As shown in FIG. 17 and FIG. 18, a second stopping portion 232 is disposed at the other end of the third battery cavity 23; a through-hole is also disposed at the lower end of the second stopping portion 232; the second elastic plate 121 of the second connecting member 12 passes the through-hole from the outside to the inside to be pressed against the cathode of the third battery 230, and the second connecting end 120 contacts the second battery 220.

In conclusion, for the cupboard lamp provided by the utility model, the third battery cavity is disposed at a relatively higher position between the first battery cavity and the second battery cavity, so the battery compartment has a better power supply capability, and compared with the traditional parallel-battery-cavity structure, the structure of the battery compartment is more compact. The batteries of the three battery cavities are connected in series through two "L"-shaped connecting members, and the two baffles on the compartment cover component can further limit the battery in the third battery cavity from moving or rolling, ensuring good electrical connection between batteries in the three battery cavities. The cupboard lamp using such battery compartment has a longer service life, a smaller size and a beautiful appearance. By pressing the lampshade, the light source switch can be controlled, so the operation is simple. The inner ring is provided with the opening structure with at least one opening respectively corresponding to the infrared probe(s) one by one. When a person enters a specific area, the infrared radiation is not emitted outside of the thick housing, so the infrared probe is more sensitive. A middle ring is designed to be sleeved on the inner ring, avoiding the infrared probe from being exposed to the outside, so the cupboard lamp has an integrated structure. Moreover, the middle ring structure is thin, rarely affecting the sensitivity of the infrared probe.

Technical problems

Solution

Beneficial effects of the present invention

The invention claimed is:

1. A cupboard lamp, comprising a battery compartment, the battery compartment comprising a compartment housing component and a compartment cover component, the compartment housing component comprising a first battery cavity and a second battery cavity, wherein the compartment housing component also comprises a third battery cavity, and the third battery cavity is positioned between the first battery cavity and the second battery cavity, and is higher than the first battery cavity and the second battery cavity, and the first through third batteries being removable from the first through third battery cavities respectively wherein a lampshade, a housing and a light source plate are also included; the light source plate is provided with a light source switch; the housing is provided with a first opening and a second opening; the lampshade comprises a first contact pin and a second contact pin located on opposite sides at the periphery of the lampshade; the first contact pin and the second contact pin are respectively penetrated into the first opening and the second opening; the light source switch is a press switch; and the first contact pin is disposed corresponding to the press switch; wherein the light source plate is provided with a cushion corresponding to the second contact pin and wherein the second contact pin does not correspond to the press switch.

2. The cupboard lamp according to claim 1, wherein the third battery cavity is positioned at a projecting portion between the first battery cavity and the second battery cavity.

3. The cupboard lamp according to claim 1, wherein the battery compartment also comprises a first connecting member and a second connecting member; the cathode of the first battery cavity and the anode of the third battery cavity are electrically connected through the first connecting member; and the cathode of the third battery cavity and the anode of the second battery cavity are electrically connected through the second connecting member.

4. The cupboard lamp according to claim 1, wherein the compartment cover component also comprises a first baffle and a second baffle for fixing a battery in the third battery cavity.

5. The cupboard lamp according to claim 1, wherein the light source plate is provided with at least one infrared probe; the housing comprises a middle ring, a housing body and an inner ring; the inner ring extends from the housing body toward the battery compartment; the outer diameter of the inner ring is smaller than the outer diameter of the housing body; the inner ring is provided with at least one opening structure respectively corresponding to the at least infrared probe; and the middle ring is sleeved on the inner ring.

6. The cupboard lamp according to claim 1, wherein the cushion has the same height as the second contact pin.

7. The cupboard lamp according to claim 2, wherein the projecting portion comprises a recessed surface.

8. The cupboard lamp according to claim 3, wherein the first connecting member and the second connecting member are both L-shaped; one end of each of the first connecting member and the second connecting member is electrically connected with the anode of a battery, and the other end is provided with an elastic plate; and each of the elastic plates is connected with the cathode of another battery.

9. The cupboard lamp according to claim 5, wherein the middle ring is provided with at least one recess respectively corresponding to the at least one infrared probe.

* * * * *